United States Patent [19]

Cox

[11] Patent Number: 4,502,619

[45] Date of Patent: Mar. 5, 1985

[54] PLYWOOD SAFETY BAR

[76] Inventor: Charles R. Cox, 917 Rex St., Louisville, Colo. 80027

[21] Appl. No.: 574,175

[22] Filed: Jan. 26, 1984

[51] Int. Cl.³ .............................................. B60P 7/08
[52] U.S. Cl. ................................. 224/311; 224/42.42; 410/121; 410/127; 211/208
[58] Field of Search ............... 410/120, 121, 127, 140, 410/141; 211/208, 190, 193, 204, 175, 103, 105.1; 224/311, 42, 313, 42.42

[56] References Cited

U.S. PATENT DOCUMENTS 3,794,227 2/1974 Stearns .......................... 224/42.03 B Primary Examiner—Stephen Marcus
Assistant Examiner—David Voorhees

[57] ABSTRACT

This plywood safety bar device serves to confine and hold plywood sheets during the loading and unloading of a semi-trailer, or other vehicle. Primarily, it consists of a mounting plate, having a sleeve secured to it. It further includes a retaining bar, which is telescopingly received within the sleeve, and is adjustably locked in place to hold the sheets against movement, also during the motion of the vehicle.

1 Claim, 4 Drawing Figures

U.S. Patent  Mar. 5, 1985  4,502,619
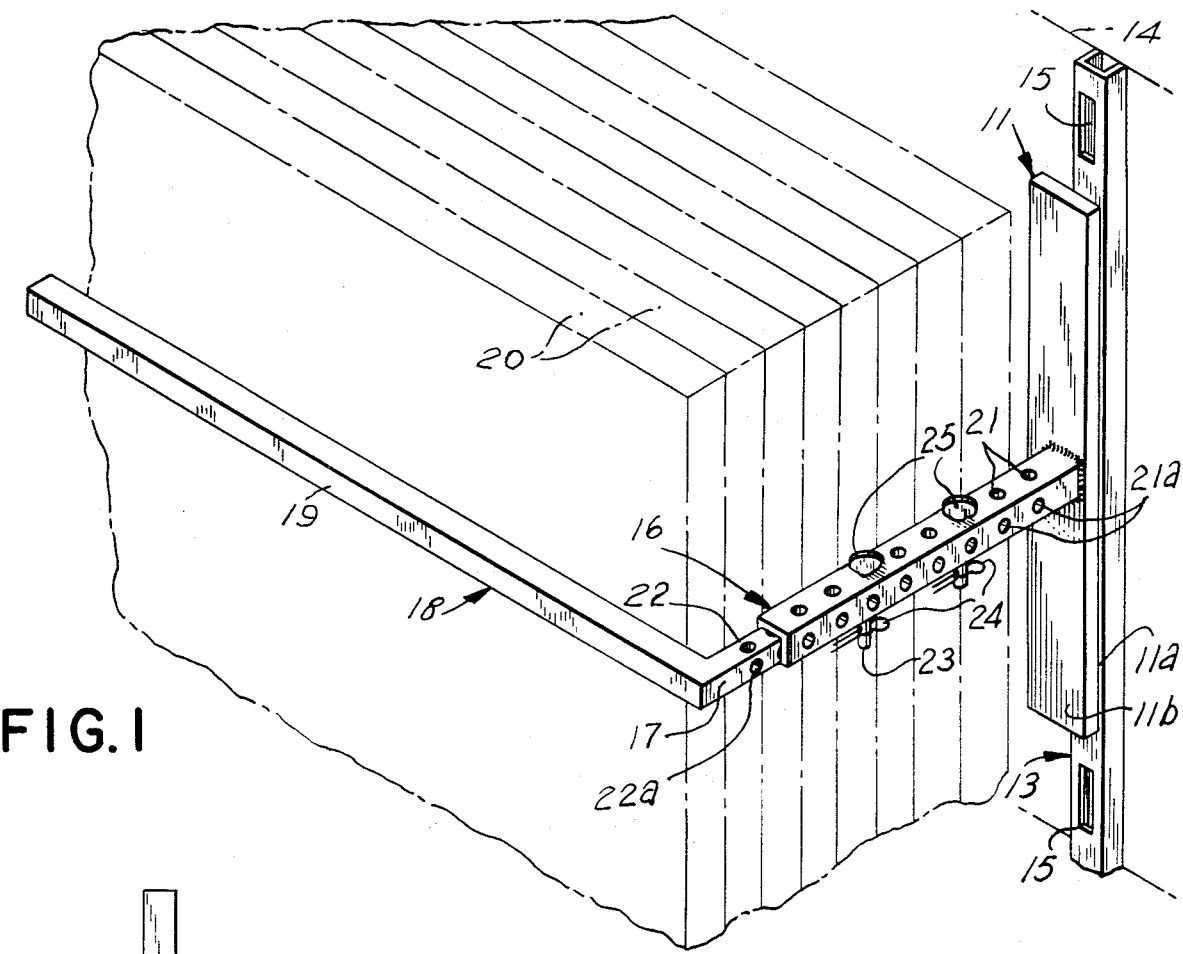
FIG. 1
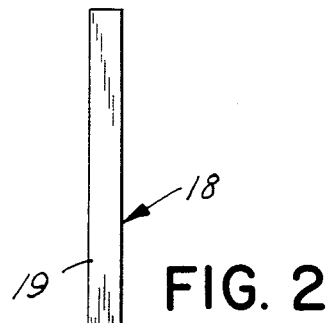
FIG. 2
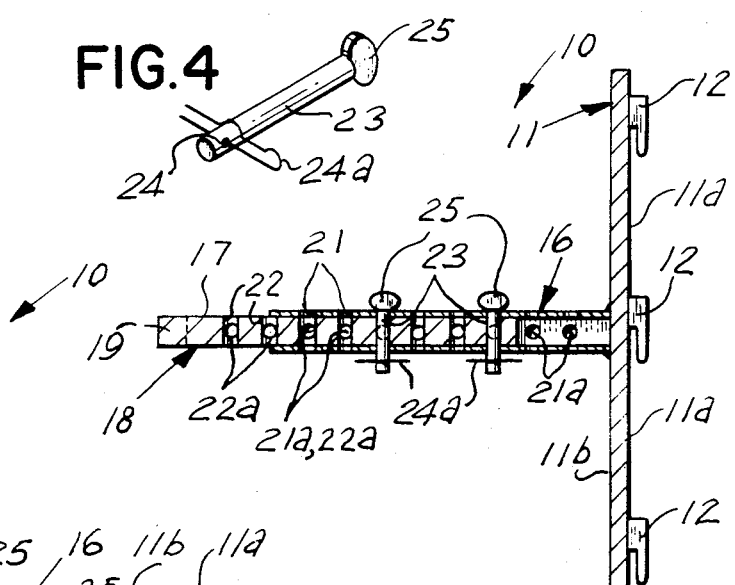
FIG. 4
FIG. 3
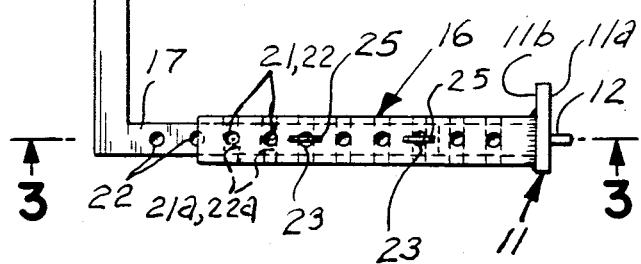

PLYWOOD SAFETY BAR

This invention relates to safety devices, and more particularly, to a plywood safety bar.

The principal object of this invention is to provide a plywood safety bar, which will be unique in design, so as to hold and retain a plurality of plywood sheets.

Another object of this invention is to provide a plywood safety bar, which will be of such structure, as to hold plywood sheets, while loading and unloading semi-trailers.

Another object of this invention is to provide a plywood safety bar, which will be fabricated of suitable metal, and will be employed especially in household and high-value products trailers.

A further object of this invention is to provide a plywood safety bar, which will include wall plate means, and an adjustable bar, for rendering different quantities of plywood sheets secure in a semi-trailer or the like.

Other objects are to provide a plywood safety bar, which is simple in design, inexpensive to manufacture, rugged in construction, easy to use, and efficient in operation.

These, and other objects, will be readily evident, upon a study of the following specification, and the accompanying drawing, wherein:

FIG. 1 is a perspective view of the present invention, shown in operative use, and illustrating the plywood and vehicle fragmentary, and in phantom;

FIG. 2 is a top plan view of the invention, shown unmounted, with the plywood removed therefrom;

FIG. 3 is a horizontal cross-sectional view, taken along the line 3—3 of FIG. 2, and FIG. 4 is an enlarged perspective view of one of the locking pin members, shown removed from the structure.

Accordingly, a safety bar device 10 is shown to include a rectangular configurated wall mounting plate 11, fabricated of iron or steel, having three equally spaced and projecting hooks 12, fixedly secured to one side face 11a, by welding or other suitable means (not shown). Hooks 12 have their open ends downward, so as to engage and retain device 10 to a channel member 13 of the wall 14 of a semi-trailer, by being received in the spaced rectangular cut-out openings 15 thereof. A tubular sleeve 16, of square cross-sectional configuration, is made of the same material as bar 11, and is welded, at one end, to the center portion of the opposite face 11b of plate 11, and the opposite end of sleeve 11 is open and telescopingly receives the short leg portion 17 of an "L"-shaped solid bar 18, which is also of the same material as 11 and 16. The longer portion 19 of bar 18 serves to engage and retain a plurality of plywood sheets 20 against the wall 14 of the vehicle, as illustrated in FIG. 1. Sleeve 16 includes a plurality of equally spaced vertical openings 21 therethrough, and bar 17 includes similarly spaced openings 22 therethrough, for removably and mutually receiving a pair of clevis locking pins 23, which serve to lock the sleeve 16 and bar 18, in any desired adjustment, for holding various numbers of plywood sheets 20 together, and stationary against the wall 14 of the vehicle. Clevis pins 23 include a transverse opening 24 through one end, which removably receives a wire pin 24a, for keeping pins 23 in place in their respective openings 21 and 22, and the opposite ends of clevis pins 23 include a flat head 25, for easy grasping by the user's fingers, to insert or remove pins 33 from openings 21 and 22.

In use, plate 11 is grasped by the user, and with the hooks 12 facing downward, and aligned with openings 15, is urged against post or channel member 13, wherein hooks 12 are entered into the openings 15. The plate 11 is then urged downwards, and released by the user, and the hooks 12 retain plate 11 to the post or channel 13. A quantity of plywood sheets 20 are then placed in alignment with each other, when placed within the confines of the wall 14 of the vehicle, the longer portion 19 of the bar 18, and the sleeve 16. The wire pins 24a are then removed from openings 24 of clevis locking pins 23, and pins 23 are removed from sleeve 16 and bar 18. The bar 18 is then urged inwards of sleeve 16, to engage with the outer stacked plywood sheet 20, and simultaneously, the appropriate aligned openings 21 and 22 are aligned, and the pins 23 inserted therein, so as to keep bar 18 in place against the sheets 20. The wire pins 24a are then inserted into openings 24 of pins 23, thus locking the bar 18 in place against the stack of plywood sheets 20, to prevent any movement thereof, when the vehicle is loaded or unloaded.

It shall be noted, that sleeve 16 and bar 18 also include horizontal openings 21a and 22a, which intersect with their like openings 21 and 22, so as to enable bar 18 to be locked in vertical positions, as well as horizontal positions, left or rights, to support and/or confine sheets 20 or other articles within the semi-trailer.

While various changes may be made in the detail construction, it is understood that such changes will be within the spirit and scope of the present invention, as is defined by the appended claims.

What I now claim is:

1. A plywood safety bar device, comprising, in combination, a metal channel member fixedly mounted vertically on an inner side of a wall of a semi-trailer vehicle, and a separate metal bar unit removably mounted along a front side of said channel member; said bar unit comprising a vertically elongated mounting plate, a tubular sleeve of cross-sectionally square configuration, rigidly welded at its one end to a front side of said mounting plate, and extending horizontally forwardly therefrom, and an "L"-shaped bar having a first leg thereof adjustably received within an opposite end of said tubular sleeve; a plurality of spaced-apart rectangular cut-out openings along said channel member, and a plurality of downwardly extending hooks projecting on a rear side of said mounting plate, for being removably received in said cut-out openings, said bar being of cross-sectionally square configuration throughout both legs thereof, a plurality of equally spaced-apart transverse openings through said tubular sleeve and said bar first leg, for selective alignment, and a pair of clevis pins removably received through selective aligned said openings for locking said bar to said sleeve, said transverse openings comprising a row of vertical holes and a row of horizontal holes in said tubular sleeve and said bar, whereby a plurality of plywood panels may be supported upright between said vehicle wall and a second of said bar legs extending around either a side or top edge of said panels.

* * * * *